March 1, 1932.  W. J. VOLLETT  1,847,504

MECHANICAL FISH BAIT

Filed July 27, 1931   2 Sheets-Sheet 1

Inventor
W. J. Vollett
By Clarence A. O'Brien
Attorney

March 1, 1932. W. J. VOLLETT 1,847,504
MECHANICAL FISH BAIT
Filed July 27, 1931 2 Sheets-Sheet 2

Inventor
W. J. Vollett
By Clarence A. O'Brien
Attorney.

Patented Mar. 1, 1932

1,847,504

UNITED STATES PATENT OFFICE

WILLIAM J. VOLLETT, OF HONOR, MICHIGAN

MECHANICAL FISH BAIT

Application filed July 27, 1931. Serial No. 553,435.

The present invention relates to mechanical fish baits and has for its prime object to provide a bait which when bit by a fish will spread to prevent the fish from removing the bait from its mouth.

A further very important object of the invention resides in the provision of mechanical fish bait of this nature which is exceedingly simple in its construction, inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
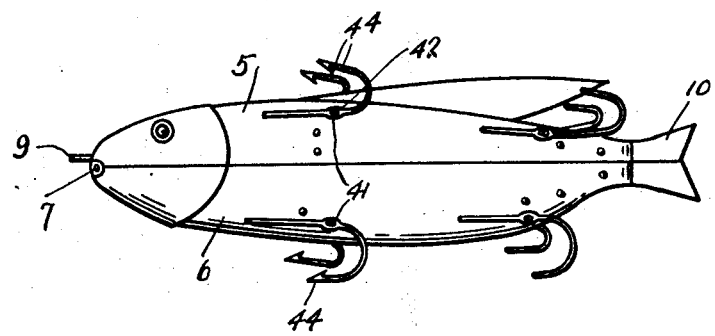
Figure 1 is a side elevation of the bait embodying the features of my invention.

Referring to the drawings in detail, it will be seen that a body is formed to simulate the shape of a small fish and is formed in sections 5 and 6. A nose piece comprises a pair of hinged sections 7 and 8 fitted on the front ends of the sections 5 and 6 riveted or otherwise secured thereto. Section 7 is formed with a forwardly directed extension 9 to which the line is engaged.

Figure 7:
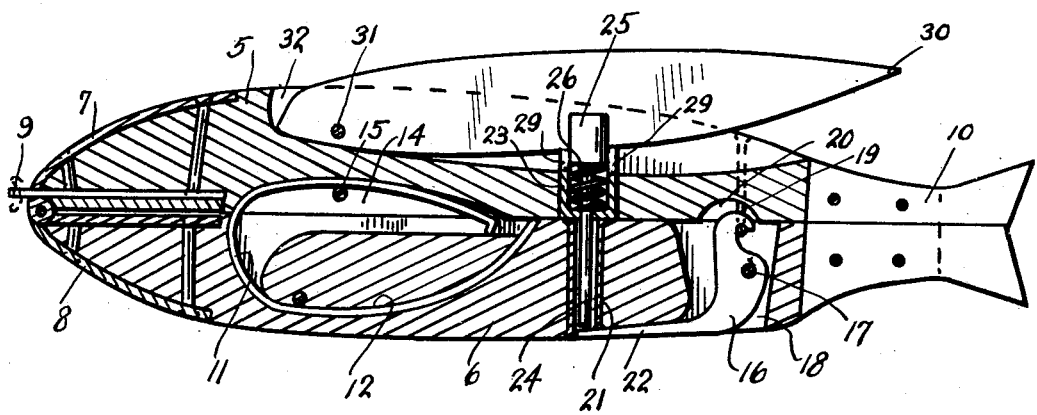
Figure 7 is a longitudinal section through the bait showing the section closed.
Figure 8:
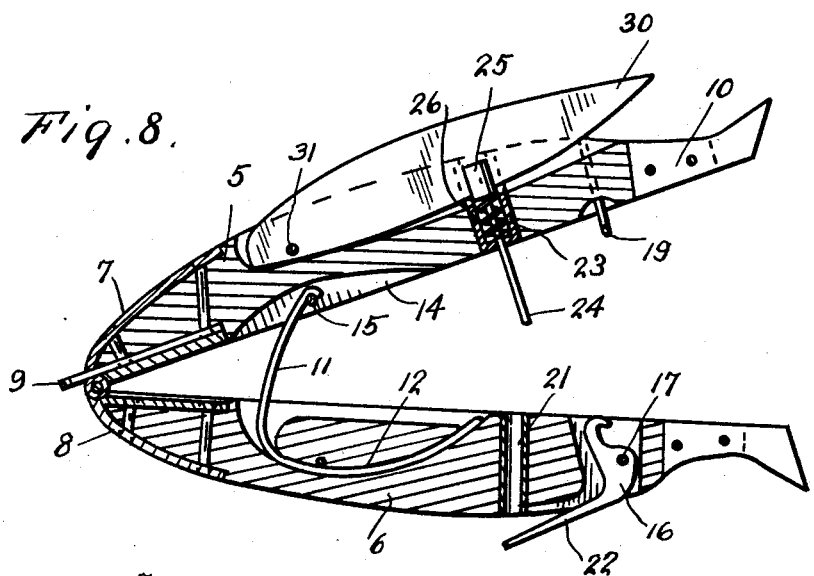
Figure 8 is a similar view showing the sections opened.
Figure 9:
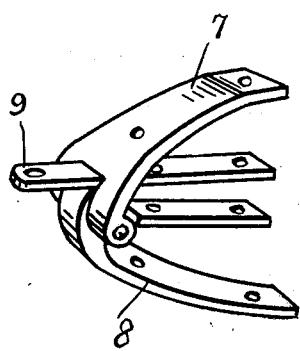
Figure 9 is a perspective view of the nose piece.

Tail pieces 10 are fitted in grooves in the rear ends of the sections 5 and 6 and are secured by cross pins or the like. A spring 11 has a portion embedded as at 12 in the section 6 and another portion extending therefrom into a recess 14 in the section 5. A stop pin 15 is mounted in this recess 14 and the end of the spring 11 is curved to engage therewith to limit the opening movement of the section as is clearly illustrated in Figure 8. This spring, of course, has a tendency to normally hold the sections in open position and therefore is under tension when the sections are closed as shown in Figure 7.

A catch 16 is rockable on a pin 17 in a recess 18 formed in the rear end of the section 6 and is adapted to engage a U-shaped hook 19 mounted in the rear portion of the section 5, said section 5 being recessed as at 20 adjacent the hook so that the catch may readily engage therewith and be released therefrom. A sleeve 21 extends through the section 6 and an arm 22 projecting from the catch is adapted to terminate thereunder. A sleeve 23 is mounted in the section 5 and has slidable therethrough a pin 24 with a notched head 25 at the upper end thereof. A spring 26 is mounted in the sleeve or cup 23 and holds the lower end of the stem out of engagement with the arm 22.

The cup or sleeve 23 has opposed slots 29. A fin like lever 30 is pivoted as at 31 in a recess 32 extending longitudinally along the upper portion of the section 5 and extends through the notch of the head 25. If the bait is in a fish's mouth and he bites down on the same, this will bring the fin like lever 30 to force the pin 24 down against the tension of the spring 26 so as to engage arm 22 and swing it thereby freeing the catch 16 from the hook 19 and permitting the spring 11 to swing the sections to open position so that the fish cannot get the bait out of its mouth.

In actual practice, sleeves 21 and 23 may be retained in position in any suitable manner, as for example each of the sleeves at the ends thereof may be flanged, with the flanges of the respective sleeves being embedded and disposed flush with corresponding faces of the respective bait body sections. Also, the spring anchoring member 12 serves as a ballast to keep the bait in an upright position as without such ballast, the fin like lever 30 would have a tendency to upset the bait. Thus the bait will be found especially useful for trolling and casting.

Figure 2:
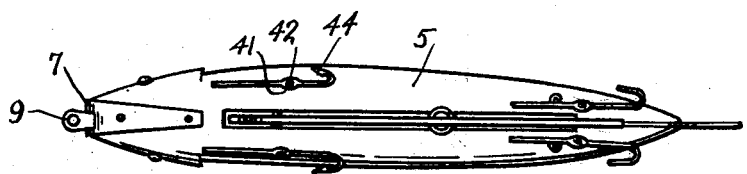
Figure 2 is a top plan view thereof.
Figure 3:
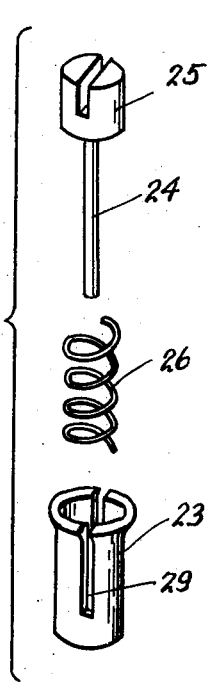
Figure 3 is a disassembled view of the catch releasing pin and associated parts.
Figure 4:
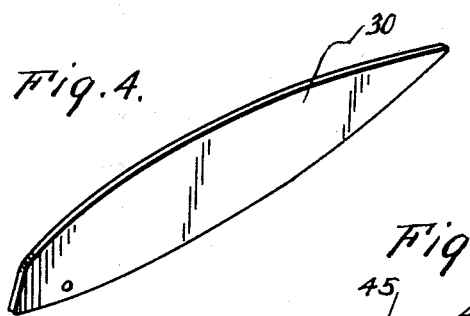
Figure 4 is a perspective view of the lever plate.
Figure 5:
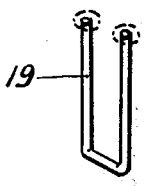
Figure 5 is a perspective view of the U-shaped hook.
Figure 6:
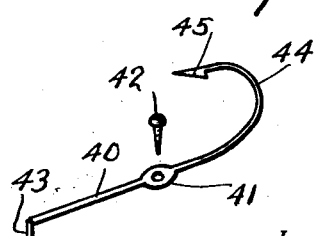
Figure 6 is a perspective view of one of the hooks.

It is thought that the construction, operation, utility and advantages of the invention will now be quite apparent to those skilled in this art. It is preferable to provide a plurality of hooks, preferably four on each section 5 and 6. Each hook includes an elongated shank portion 40 with an eye 41 formed intermediate its ends so that a screw 42 may be inserted therethrough to be engaged in the sections 5 or 6 and at one end the shank is offset as at 43 so that this offset portion may be embedded in the sections 5 or 6. The hook proper 44 of the stem may be provided with a beard 45 or not as desired. I find it preferable to have the beards on the front hooks and to leave them off the rear hooks as is clearly illustrated in Figures 1 and 2 of the drawings.

The present embodiment of the invention has been described in considerable detail merely for the purposes of exemplification since in actual practice it attains the features of advantages enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A mechanical fish bait of the class described including a body formed in two sections, hinge means connecting adjacent ends of the sections, a fin like lever rockably mounted in a recess in one section, a hook extending from said last mentioned section, a catch rockable in a recess in the other section, and engageable with the hook, and a pin slidable in the section with the lever and through the other section to engage the catch so that when the lever is rocked inwardly of its section, the pin engages the catch and swings it free of the hook.

2. A mechanical fish bait of the class described including a body formed in two sections, hinge means connecting adjacent ends of the sections, a fin like lever rockably mounted in a recess in one section, a hook extending from said last mentioned section, a catch rockable in a recess in the other section, and engageable with the hook, a pin slidable in the section with the lever and through the other section to engage the catch so that when the lever is rocked inwardly of its section, the pin engages the catch and swings it free of the hook, and spring means normally holding the sections open when the catch is released.

3. A mechanical fish bait of the class described including a body formed in two sections, hinge means connecting adjacent ends of the sections, a fin like lever rockably mounted in a recess in one section, a hook extending from said last mentioned section, a catch rockable in a recess in the other section, and engageable with the hook, and a pin slidable in the section with the lever and through the other section to engage the catch so that when the lever is rocked inwardly of its section, the pin engages the catch and swings it free of the hook, and spring means normally holding the sections open when the catch is released, said spring means including an elongated spring having a portion embedded in one section and another portion in a recess in another section.

In testimony whereof I affix my signature.

WILLIAM J. VOLLETT.